US012697744B2

(12) United States Patent
Patel et al.

(10) Patent No.: US 12,697,744 B2
(45) Date of Patent: Aug. 4, 2026

(54) PROFILE CUTTING TOOL

(71) Applicant: BLACK & DECKER INC., New Britain, CT (US)

(72) Inventors: Swapnil Ashok Patel, Maharashtra (IN); Rahul Ramkrushna Raut, Maharashtra (IN)

(73) Assignee: Black & Decker Inc., New Britain, CT (US)

( * ) Notice: Subject to any disclaimer, the term of this patent is extended or adjusted under 35 U.S.C. 154(b) by 304 days.

(21) Appl. No.: 18/325,701

(22) Filed: May 30, 2023

(65) Prior Publication Data

US 2023/0381867 A1 Nov. 30, 2023

(30) Foreign Application Priority Data

May 31, 2022 (IN) .............................. 202211031223

(51) Int. Cl.
B26D 3/16 (2006.01)

(52) U.S. Cl.
CPC ............ B26D 3/16 (2013.01); B23B 2215/72 (2013.01)

(58) Field of Classification Search
CPC ....................................................... B26D 3/16
See application file for complete search history.

(56) References Cited

U.S. PATENT DOCUMENTS

| | | | | |
|---|---|---|---|---|
| 4,155,383 A | * | 5/1979 | Welliver ................... | B27C 5/10 |
| | | | | 83/486.1 |
| 4,244,253 A | * | 1/1981 | Flanigan .............. | B23Q 1/4804 |
| | | | | 144/144.1 |
| 4,266,457 A | * | 5/1981 | Balch ....................... | B23Q 1/48 |
| | | | | 30/92 |
| 4,384,901 A | * | 5/1983 | Swoboda, III ......... | B23K 7/006 |
| | | | | 148/195 |
| 4,630,656 A | * | 12/1986 | Collins ................ | B23Q 9/0078 |
| | | | | 144/136.95 |
| 4,735,531 A | * | 4/1988 | Boerckel ........... | B23Q 11/0046 |
| | | | | 144/136.95 |
| 4,903,559 A | * | 2/1990 | Landeck ................. | B26F 3/004 |
| | | | | 83/37 |
| 4,913,206 A | * | 4/1990 | Altinbasak ........... | B23Q 1/4866 |
| | | | | 144/144.1 |

(Continued)

FOREIGN PATENT DOCUMENTS

| | | |
|---|---|---|
| CN | 112605462 A | 4/2021 |
| CN | 213970274 U | 8/2021 |

(Continued)

OTHER PUBLICATIONS

Extended European Search Report, EP Application No. 23174624.9, Dec. 20, 2023, 8 pages, EPO.

*Primary Examiner* — Sean M Michalski
(74) *Attorney, Agent, or Firm* — Brake Hughes Bellermann LLP

(57) ABSTRACT

A profile cutting tool includes a base, a clamp mounted to the base configured to hold an elongate workpiece, a pivotable frame pivotally mounted to the base, and a workpiece cutting assembly mounted to the pivotable frame and comprising a cutter configured to cut the elongate workpiece held in the clamp. When the pivotable frame pivots with respect to the base, the cutter is configured to move along an arcuate profile cutting path having a first radius.

20 Claims, 9 Drawing Sheets

(56) References Cited

U.S. PATENT DOCUMENTS

| | | | | |
|---|---|---|---|---|
| 4,995,288 | A * | 2/1991 | DellaPolla | B27B 27/08 |
| | | | | 83/486.1 |
| 5,038,841 | A * | 8/1991 | Larmon | B23Q 9/0021 |
| | | | | 144/48.6 |
| 5,136,904 | A * | 8/1992 | Peters | B23D 51/16 |
| | | | | 83/13 |
| 5,369,887 | A * | 12/1994 | Keevers | B27B 19/02 |
| | | | | 30/394 |
| 5,853,036 | A * | 12/1998 | Welch | B27G 5/04 |
| | | | | 144/137 |
| 5,896,799 | A * | 4/1999 | Chen | B23D 51/14 |
| | | | | 83/662 |
| 6,113,088 | A * | 9/2000 | Gakhar | B25B 5/105 |
| | | | | 269/220 |
| 6,158,930 | A * | 12/2000 | Etter | B23Q 9/0028 |
| | | | | 33/630 |
| 6,412,764 | B1 * | 7/2002 | Hebert | B25B 11/02 |
| | | | | 269/45 |
| 6,484,767 | B2 * | 11/2002 | Cameron | B23Q 1/017 |
| | | | | 144/286.5 |
| 6,550,365 | B1 * | 4/2003 | Zhang | B23D 49/007 |
| | | | | 83/785 |
| 6,574,873 | B2 * | 6/2003 | Kordyak | B23D 59/00 |
| | | | | 30/372 |
| 7,607,870 | B2 | 10/2009 | Hughes, Jr. | |
| 8,152,419 | B1 * | 4/2012 | Snyder | B23B 47/281 |
| | | | | 408/110 |
| 8,495,940 | B2 * | 7/2013 | Abe | B23D 45/042 |
| | | | | 30/388 |
| 8,607,680 | B1 * | 12/2013 | Carr | B23D 45/025 |
| | | | | 83/486.1 |
| 8,734,066 | B2 * | 5/2014 | Rusch | B25B 5/08 |
| | | | | 279/107 |
| 9,415,525 | B1 * | 8/2016 | Mitchell | B23Q 9/0021 |
| 10,780,486 | B1 | 9/2020 | Wong | |
| 2004/0200331 | A1 * | 10/2004 | Chen | B25B 5/142 |
| | | | | 83/781 |
| 2005/0172769 | A1 * | 8/2005 | Maes | B23D 47/00 |
| | | | | 83/490 |
| 2005/0178260 | A1 * | 8/2005 | Bokelaar | B23D 47/02 |
| | | | | 83/486.1 |
| 2005/0183559 | A1 * | 8/2005 | Rue | B25H 1/04 |
| | | | | 83/859 |
| 2007/0295182 | A1 * | 12/2007 | Stone | B27B 27/08 |
| | | | | 83/454 |
| 2008/0107490 | A1 * | 5/2008 | Hughes | B23B 41/003 |
| | | | | 408/103 |
| 2009/0022559 | A1 * | 1/2009 | Hughes, Jr. | B25H 1/00 |
| | | | | 408/103 |
| 2014/0318341 | A1 * | 10/2014 | Fait | B27B 27/08 |
| | | | | 83/477 |
| 2015/0047484 | A1 * | 2/2015 | Lane | B27B 9/04 |
| | | | | 83/56 |
| 2021/0213644 | A1 * | 7/2021 | Trudeau | B26D 1/08 |
| 2022/0088688 | A1 | 3/2022 | Gambino | |
| 2024/0246276 | A1 * | 7/2024 | Sun | B21D 43/28 |

FOREIGN PATENT DOCUMENTS

| | | |
|---|---|---|
| DE | 102015122651 B4 | 3/2018 |
| WO | 2011/037425 A2 | 3/2011 |

* cited by examiner

PROFILE CUTTING TOOL

This application claims priority under 35 U.S.C. § 119 to Indian Patent Application No. 202211031223, filed May 31, 2022, titled "A Profile Cutter," which is incorporated by reference.

TECHNICAL FIELD

This application relates a profile cutting tool, such as a profile pipe cutter.

BACKGROUND

Sometimes a first pipe needs to be attached to the side of a second pipe. In order to attach the first and second pipes together it is necessary to cut a radial profile on the first pipe so that a lip at the end of the first pipe completely engages the side of the second pipe.

It is known to cut a radial profile in a pipe with a jig assembly comprising a hole saw. The second pipe is clamped in the jig assembly and fixed with respect to the rotation axis of the hole saw. The hole saw is then moved towards the second pipe in the direction along the rotation axis and a radial profile is cut in the second pipe. This arrangement is shown in e.g. DE 2015 122 651, U.S. Pat. Nos. 10,780,486, 7,607,870 and US 2009/0022559.

A problem with this arrangement is that the radial profile is determined by the radius of the hole saw. Therefore, if the user needs to cut different radial profiles in pipes, then the user needs to keep changing the hole saw. This can be time consuming and inefficient.

SUMMARY

According to an aspect of the present disclosure, a profile cutting tool includes a base; a clamp mounted to the base configured to hold an elongate workpiece; a pivotable frame pivotally mounted to the base; and a workpiece cutting assembly mounted to the pivotable frame and comprising a cutter configured to cut the elongate workpiece held in the clamp; wherein when the pivotable frame pivots with respect to the base, the cutter is configured to move along an arcuate profile cutting path a having a first radius.

Implementations of this aspect may include one or more of the following features. Optionally, the elongate workpiece cutting assembly is moveably mountable at a plurality of different positions on the pivotable frame. Optionally, the pivotable frame comprises an upper pivotable arm and a lower pivotable arm. Optionally, the upper pivotable arm and/or lower pivotable arm comprises a guide slot configured to receive the cutter. Optionally, the cutter is a reciprocal cutting blade. Optionally, the workpiece cutting assembly comprises a motor operatively coupled to the cutter. Optionally, the clamp is mounted on a raised shelf above the base. Optionally, the lower pivotable arm is arranged to move between the raised shelf and the base. Optionally, the clamp comprises a pivotable fence configured to clamp the elongate workpiece at an angle to a longitudinal axis of the base. Optionally, the first radius corresponds to a radius of a primary pipe to which the elongate workpiece is to be mounted. Optionally, the cutting assembly is configured to cut a secondary pipe having a second radius. Optionally, the first radius is different from the second radius.

Optionally, the elongate workpiece cutting assembly comprises a locking mechanism for selectively locking the workpiece cutting assembly to the pivotable frame. Optionally, the workpiece cutting assembly comprises at least guide bracket for slidable engagement with the pivotable frame. Optionally, the pivotable frame comprises a plurality of predetermined cutting positions for receiving the at least one guide bracket each predetermined position corresponding to a different first radius. Optionally, the pivotable frame comprises a scale indicating one or more predetermined cutting positions. Optionally, the base comprises an upright bracket and the pivotable frame is pivotally mounted to the upright bracket. Optionally, a pivot axis between the upright bracket and the pivotable frame is aligned with a longitudinal axis of the base. Optionally, the workpiece cutting assembly comprises one of a circular saw, a hole saw, a reciprocating saw, a band saw, a laser cutter, a plasma cutter, a grinding disk, a serrated rod, or a serrated cable.

Various other aspects and further examples are also described in and will be apparent from the detailed description, the drawings, and the claims.

DETAILED DESCRIPTION

Figure 1:
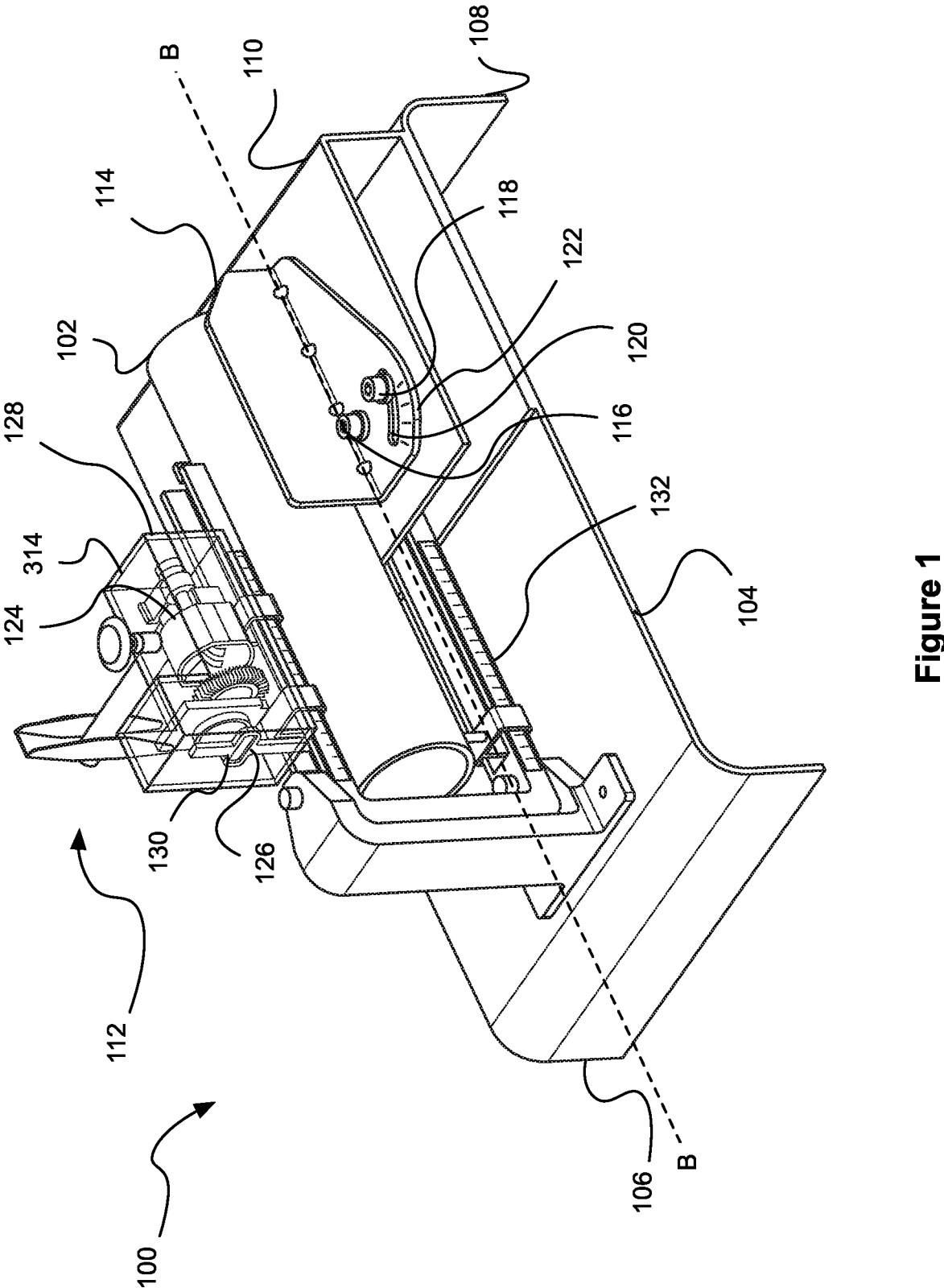
FIG. 1 shows a perspective view of a profile cutting tool according to an example.

FIG. 1 shows a perspective view of a profile cutting tool 100. The profile cutting tool 100 is configured to cut a curved profile in a workpiece 102. In some examples, the workpiece 102 is an elongate workpiece such as a secondary pipe 102 to be mounted to a primary pipe 800 (best shown in FIG. 8). The Figures illustrate the workpiece 102 as a secondary pipe 102, but in other examples, the workpiece 102 can be any other suitable elongate workpiece 102 such as a rod, beam, tubing, I beam, girder, etc. Hereinafter, the workpiece 102 will be referred to either the workpiece 102 or the secondary pipe 102, but as mentioned the workpiece 102 can be anything that requires a profile cut to fit another curved object.

Figure 8:
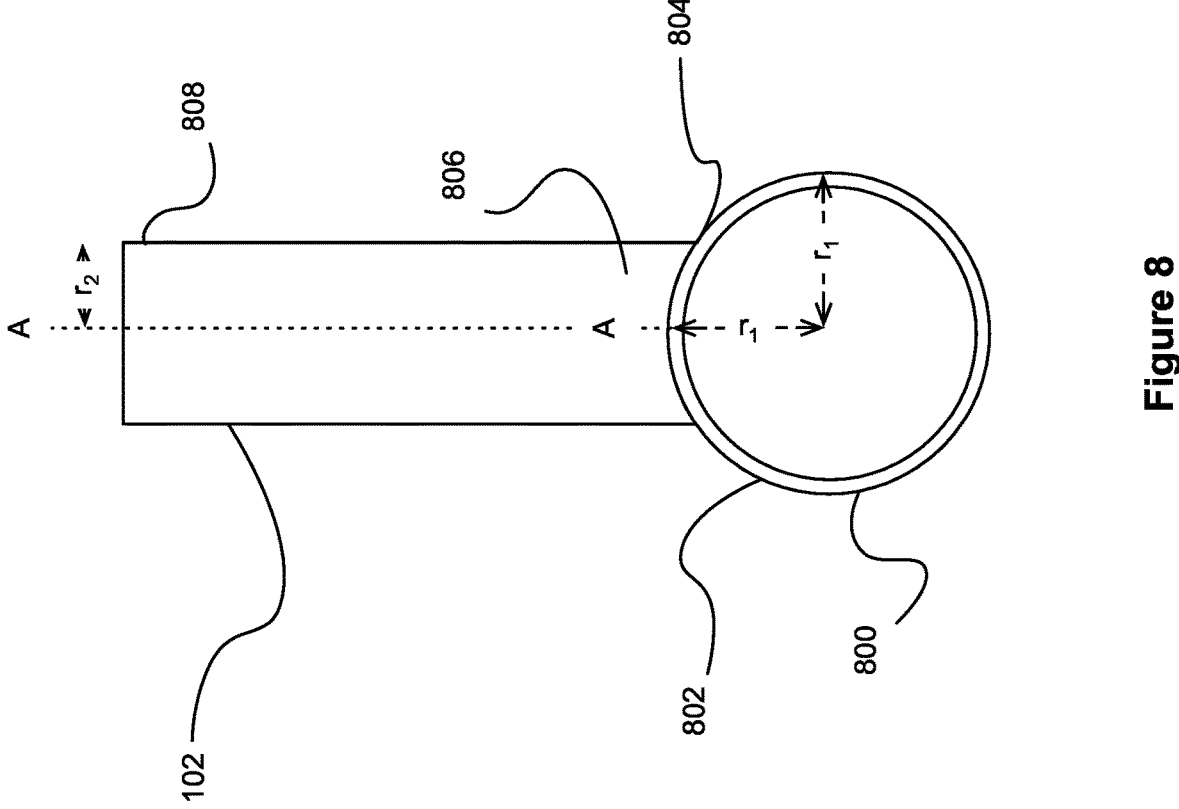
FIG. 8 shows a side view of a first pipe joined to a second pipe.

Turning to FIG. 8, cutting and fitting a primary pipe 800 to a secondary pipe 102 will be briefly discussed. In some construction jobs it is necessary to attach a primary pipe 800 having a first radius r1 to a secondary pipe 102 having a second radius r2. As mentioned above, the secondary pipe 102 is the workpiece 102 as shown in FIG. 1.

In order for the secondary pipe 102 to abut against a pipe surface 802 of the primary pipe 800, the secondary pipe 102 requires a radial profile 804 cut into the first end 806 of the secondary pipe 102. The secondary pipe 102 and the primary pipe 800 are shown together in FIG. 8. FIG. 8 shows a side view of the secondary pipe 102 and the primary pipe 800 after the secondary pipe 102 has been cut with the radial profile 804.

For example the other end 808 of the secondary pipe 102 comprises a straight cut perpendicular to the longitudinal axis A-A of the secondary pipe 102. The straight cut of the other end 808 cannot abut against the pipe surface 802 of the primary pipe 800. It is desirable or necessary to ensure that the radial profile 804 of the first end 806 of the secondary pipe 102 can completely engage against the surface 802 of the primary pipe 800. This is to ensure both the secondary pipe 102 and the primary pipe 800 can be securely attached together e.g. welded together. If the secondary pipe 102 and the primary pipe 800 are required to convey e.g. a gas or a liquid, then it is important that the join between the secondary pipe 102 and the primary pipe 800 fit together without leaving gaps.

The secondary pipe 102 as shown in FIG. 8 comprises a second radius r2 which is smaller than a first radius r1 of the primary pipe 800. In the example in FIG. 8, the secondary pipe 102 is smaller than the primary pipe 800. However, in other examples the secondary pipe 102 can be the same size as the primary pipe 800 or larger than the primary pipe 800. In other words the secondary pipe 102 and the primary pipe 800 can be any relative size with respect to each other e.g. r1<r2, r1=r2, or r1>r2.

The examples as shown in the Figures e.g. FIG. 8 show the secondary pipe 102 and the primary pipe 800 comprising a circular cross section. In some other examples, the secondary pipe 102 does not have to have a circular cross section. Indeed, the secondary pipe 102 can have a square, rectangular, triangular, or any other suitable cross section. For example the workpiece 102 can be a portion of square tubing (not shown). In other examples, the secondary pipe 102 can be solid e.g. a rod or an I beam (not shown).

Turning back to FIGS. 1 and 2, the profile cutting tool 100 will now be discussed in more detail. The profile cutting tool 100 comprises a base 104 optionally having a first stand portion 106 and a second stand portion 108. The first and second stand portions 106, 108 are configured to raise the base 104 above a worksurface e.g. a workbench (not shown). The first and second stand portions 106, 108 are optional and in some examples, the base 104 engages directly with the worksurface of the workbench.

As shown in FIG. 1, the first and second stand portions 106, 108 provide a clearance between an underside of the base 104 and the worksurface. This means fastenings projecting below the base 104 do not engage the worksurface. Accordingly, the first and second stand portions 106, 108 allow the base 104 to be placed stably on the worksurface. The first and second stand portions 106, 108 in some examples are integral with the base 104. This means that the first and second stand portions 106 can be formed from the same element as the base 104. For example, the base 104, the first stand portion 106 and the second stand portion 108 are formed from the same piece of sheet metal and the first and second stand portions 106, 108 are formed from bending the piece of sheet metal.

In some other examples, the first and second stand portions 106, 108 are not integral with the base 104 and are connected to the base 104. For example, the base 104 comprises three or four legs (not shown) mounted to the base 104. In other examples, the base 104 comprises a plurality of rubber feet mounted on the underside of the base 104.

In some examples, the base 104 optionally comprises a shelf 110. The shelf 110 is raised above the base 104 and comprises a workpiece clamp 112 and a fence 114. The shelf 110 permits the workpiece 102 to be clamped above the base 104 and allows part of a cutting blade 316 (best shown in FIG. 3) to extend underneath the workpiece 102. Turning back to FIG. 1, the workpiece clamp 112 is configured to hold the workpiece 102 against the fence 114. When the workpiece clamp 112 holds the workpiece 102 against the fence 114, the workpiece 102 is fixed with respect to the base 104.

The workpiece clamp 112 as shown in FIG. 1 is clamping the workpiece 102 in line with a longitudinal axis B-B of the base 104. The workpiece 102 as shown in FIG. 1 is the secondary pipe 102 and the longitudinal axis A-A (best shown in FIG. 4) of the secondary pipe 102 is parallel to the longitudinal axis B-B of the base 104.

Figure 2:
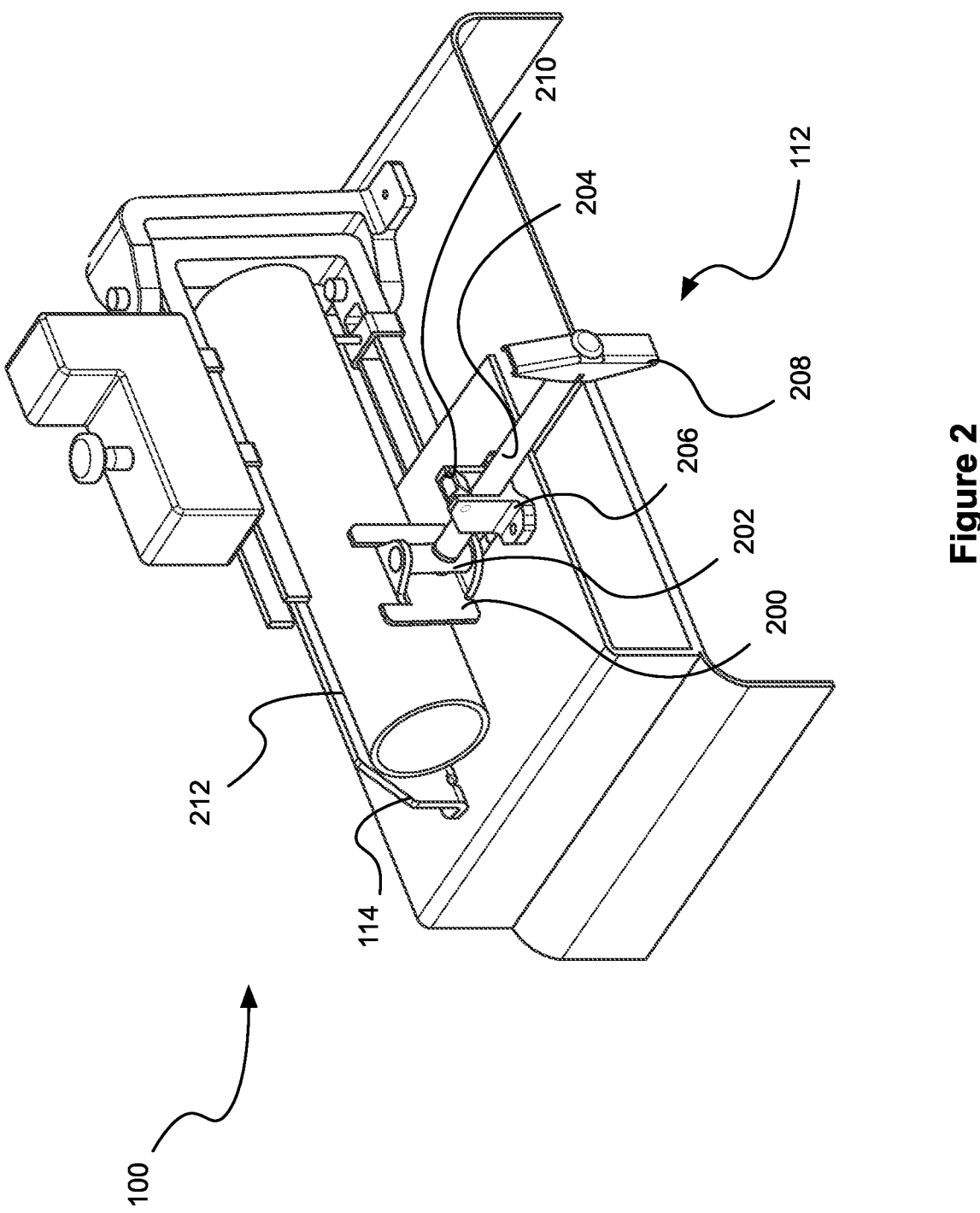
FIG. 2 shows a reverse perspective view of a profile cutting tool according to an example.

FIG. 2 shows a reverse perspective view of the profile cutting tool 100 and shows the workpiece clamp 112 in more detail. The workpiece clamp 112 comprises a workpiece engagement plate 200. The workpiece engagement plate 200 is configured to engage the surface 212 of the workpiece 102. As shown in FIGS. 1 and 2 the workpiece engagement plate 200 and the fence 114 are flat planar elements. However, in some other examples (not shown), the workpiece engagement plate 200 and the fence 114 are optionally be shaped to correspond to the workpiece 102. For example, if the workpiece 102 is a secondary pipe 102, the workpiece engagement plate 200 and the fence 114 can also be curved to engage a greater area of the surface 212 of the workpiece 102.

In some examples, the workpiece engagement plate 200 is optionally pivotally mounted to a pivot rod 202. The workpiece engagement plate 200 is configured to pivot with respect to the pivot rod 202.

In addition, the fence 114 is also the workpiece engagement plate 200 and the fence 114 is pivotally mounted at pivot bolt 116 (shown in FIG. 1). The fence 114 can be adjusted by loosening locking bolt 118 and sliding the locking bolt 118 within the fence slot 120. The fence slot 120 comprises an angular scale 122 for indicating the angular offset of the fence 114 with respect to the longitudinal axis B-B of the base 104. The locking bolt 118 is tightened after adjustment and the fence 114 is fixed with respect to the base 104.

Figure 4:
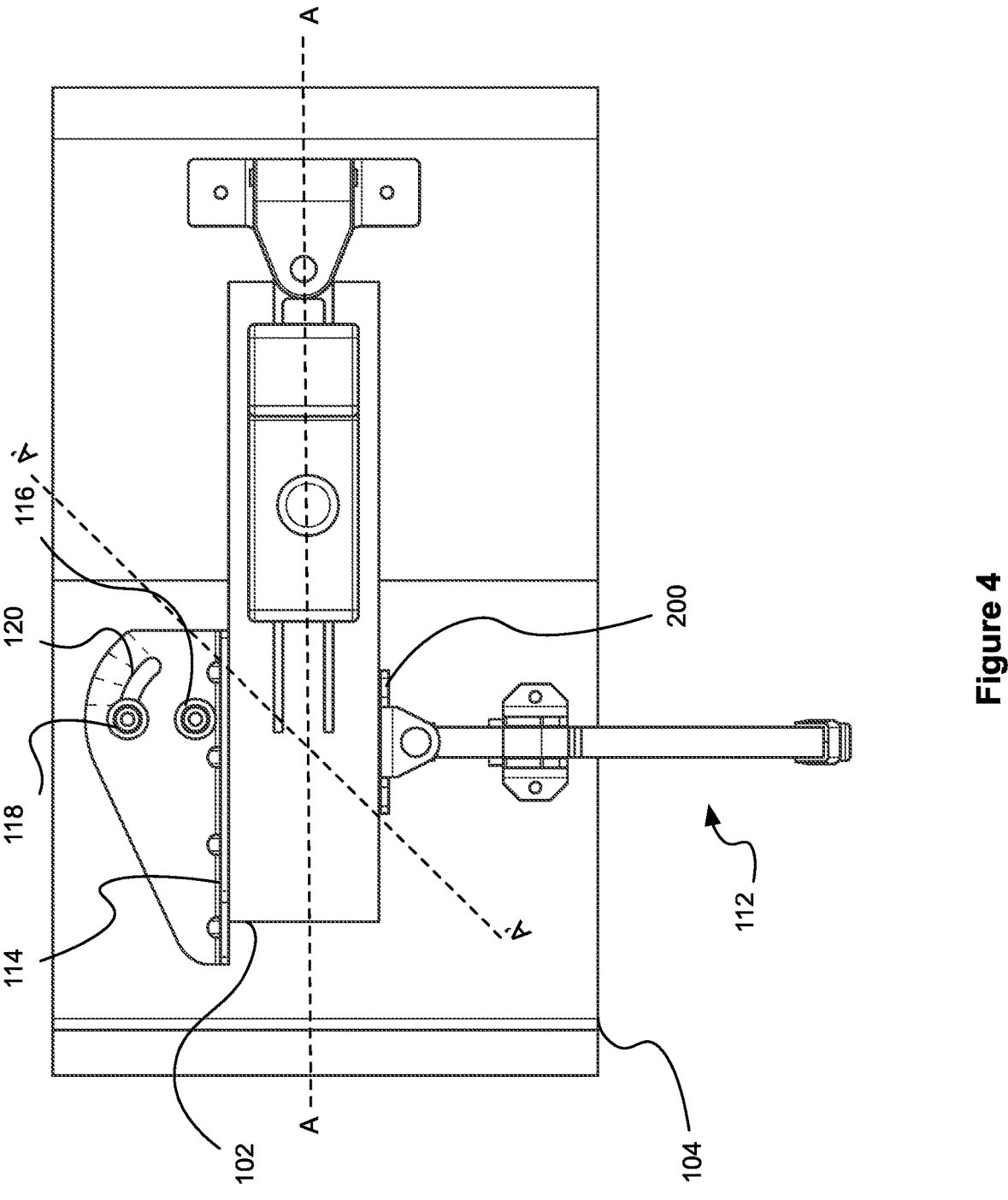
FIG. 4 shows a plan view a profile cutting tool according to an example.

When the fence 114 is angled with respect to the longitudinal axis B-B of the base 104, the workpiece engagement plate 200 pivots about the pivot rod 202 as the workpiece engagement plate 200 urges the workpiece 102 towards the fence 114. Accordingly, when the fence 114 is angled with respect to the longitudinal axis B-B of the base 104, the workpiece 102 clamped also at angle to the longitudinal axis B-B of the base 104. In other words, the longitudinal axis A-A of the elongate workpiece 102 is angled with respect to the longitudinal axis B-B of the base 104 (e.g. longitudinal axis A-A of the elongate workpiece 102 is rotated and aligns along axis A'-A' as shown in FIG. 4 when the fence 114 is angled with respect to the longitudinal axis B-B).

Whilst FIGS. 1 and 2 show a fence 114 and workpiece clamp 112 that are configured to clamp the workpiece 102 at an angle to the longitudinal axis B-B of the base 104, this is optional. In other examples, the fence 114 and the workpiece engagement plate 200 are fixed in a plane which is parallel with respect to the longitudinal axis B-B of the base 104.

The pivot rod 202 is mounted to a clamping rod 204. At least a portion of the clamping rod 204 comprises a screw thread (not shown). The screw threaded portion of the clamping rod 204 threads into a clamp mount 206. The clamp mount 206 is fastened to the base 104 with bolts (not shown) or any other suitable fastening. In some examples (not shown) the clamp mount 206 is welded to the base 104.

The clamp mount 206 comprises a reciprocal threaded surface (not shown) for engaging the screw threaded portion of the clamping rod 204. A clamping handle 208 is connected to the clamping rod 204 for permitting the user to manually tighten or loosen the clamping rod 204. The clamp mount 206 optionally comprises a quick release catch 210 configured to release the clamping rod 204 from the clamp mount 206. When the quick release catch 210 is not engaged, the clamping rod 204 is configured to be slid in and out with respect to the clamp mount 206. This allows for the workpiece engagement plate 200 to be quickly moved away from or towards the workpiece 102.

FIG. 4 shows a plan view of the profile cutting tool 100. In particular, FIG. 4 shows the workpiece clamp 112 urging the workpiece engagement plate 200 against the fence 114 whist the longitudinal axis A-A of the workpiece 102 is parallel with the longitudinal axis B-B of the base 104. FIG. 4 shows the longitudinal axis A-A of the workpiece 102 is colinear with the longitudinal axis B-B (and longitudinal axis B-B has not been labelled in FIG. 4 for the purposes of clarity.)

In other examples, other mechanisms can be used to hold the workpiece 102 against the fence 114. Any suitable clamping mechanism can be used to hold the workpiece 102 fixed with respect to the base 104 during operation of the profile cutting tool 100. For example a removeable clamp can be used to hold the workpiece 102 against the fence 114.

Figure 3:
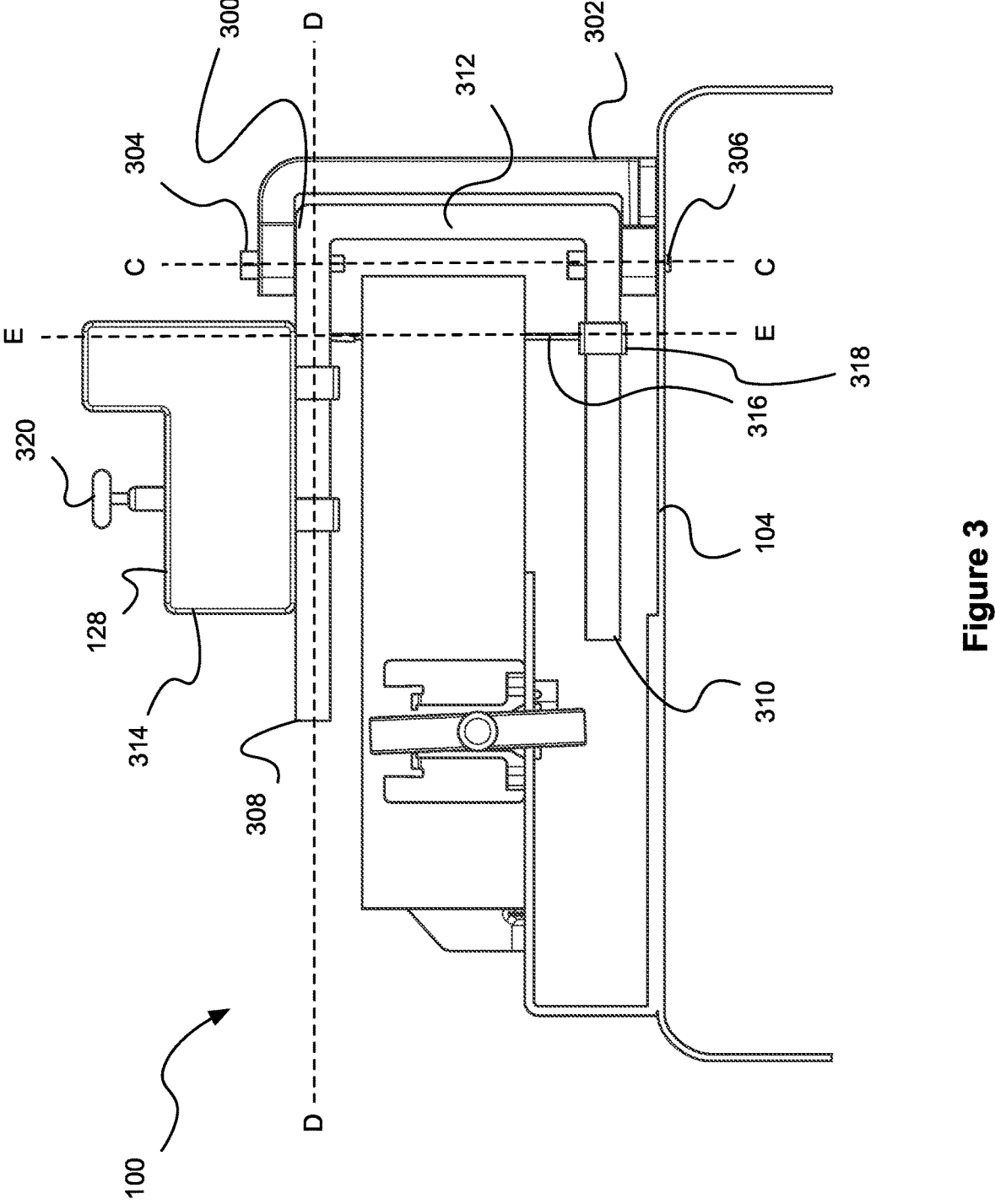
FIG. 3 shows a side view a profile cutting tool according to an example.
Figure 5:
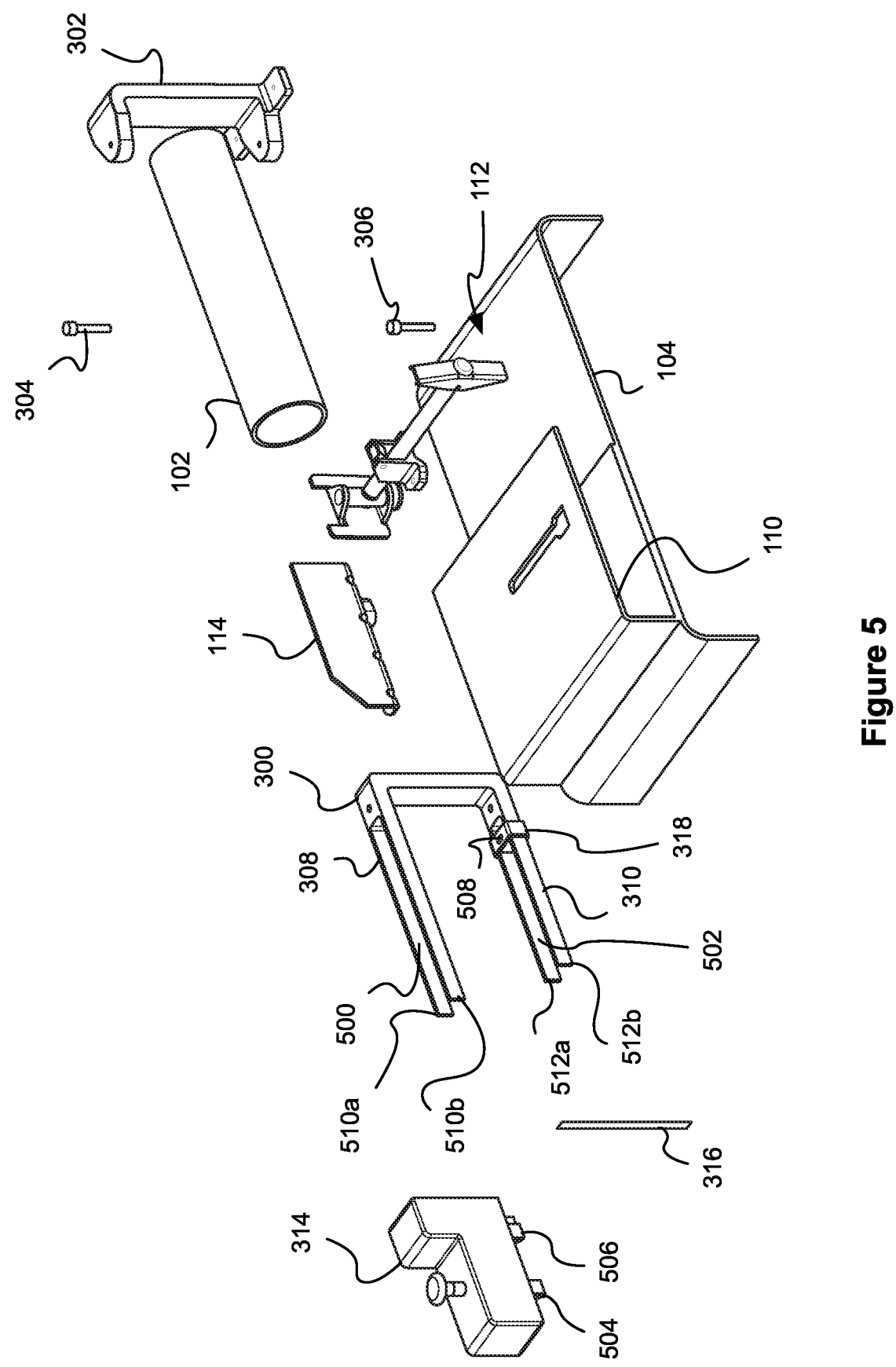
FIG. 5 shows an exploded perspective view of a profile cutting tool according to an example.

The profile cutting tool 100 will now be discussed in further detail with reference to FIGS. 3 and 5. FIG. 3 shows a side view of the profile cutting tool 100. FIG. 5 shows an exploded perspective view of the profile cutting tool 100.

The profile cutting tool 100 comprises a pivotable frame 300 pivotally mounted to the base 104 via an upright bracket 302. The upright bracket 302 is bolted to the base 104 and fixed with respect to the base 104. The upright bracket 302 comprises an upper pivot pin 304 and a lower pivot pin 306 and the pivotable frame 300 is mounted to the upright bracket 302 via the upper and lower pivot pins 304, 306. Accordingly, the pivotable frame 300 is configured to pivot about a pivot axis C-C.

The pivotable frame 300 as shown in FIG. 3 comprises an upper pivotable arm 308 and a lower pivotable arm 310. The upper pivotable arm 308 and the lower pivotable arm 310 are connected together via an upright connecting portion 312. The upper pivotable arm 308, the lower pivotable arm 310 and the upright connecting portion 312 are integral and form a "C-shaped" pivotable frame 300. In some other examples, upper pivotable arm 308, the lower pivotable arm 310 and the upright connecting portion 312 are separate pieces fixed together. The upper pivotable arm 308, the lower pivotable arm 310 and the upright connecting portion 312 are configured to move together. The pivotable frame 300 provides a secure and stable structure for mounting a workpiece cutting assembly 314. The workpiece cutting assembly 314 will be discussed in more detail below.

The upright bracket 302 in some examples, also comprises a "C-shaped" profile. This allows the pivotable frame 300 to be pivotally mounted to upright bracket 302 via both the upper pivot pin 304 and the lower pivot pin 306. This increases the stability of the pivotable frame 300 and ensures that the pivotable frame 300 moves through the plane D-D which is parallel to the base 104. Although not shown, the shelf 110 is pivotable and can comprise an inclining mechanism (not shown) configured to incline the shelf 110 and the workpiece 102 clamped to the fence 114 with respect to the plane D-D. This may be useful if the secondary pipe 102 needs to be attached to the primary pipe 800 other than perpendicularly to the longitudinal axis of the primary pipe 800.

Figure 9:
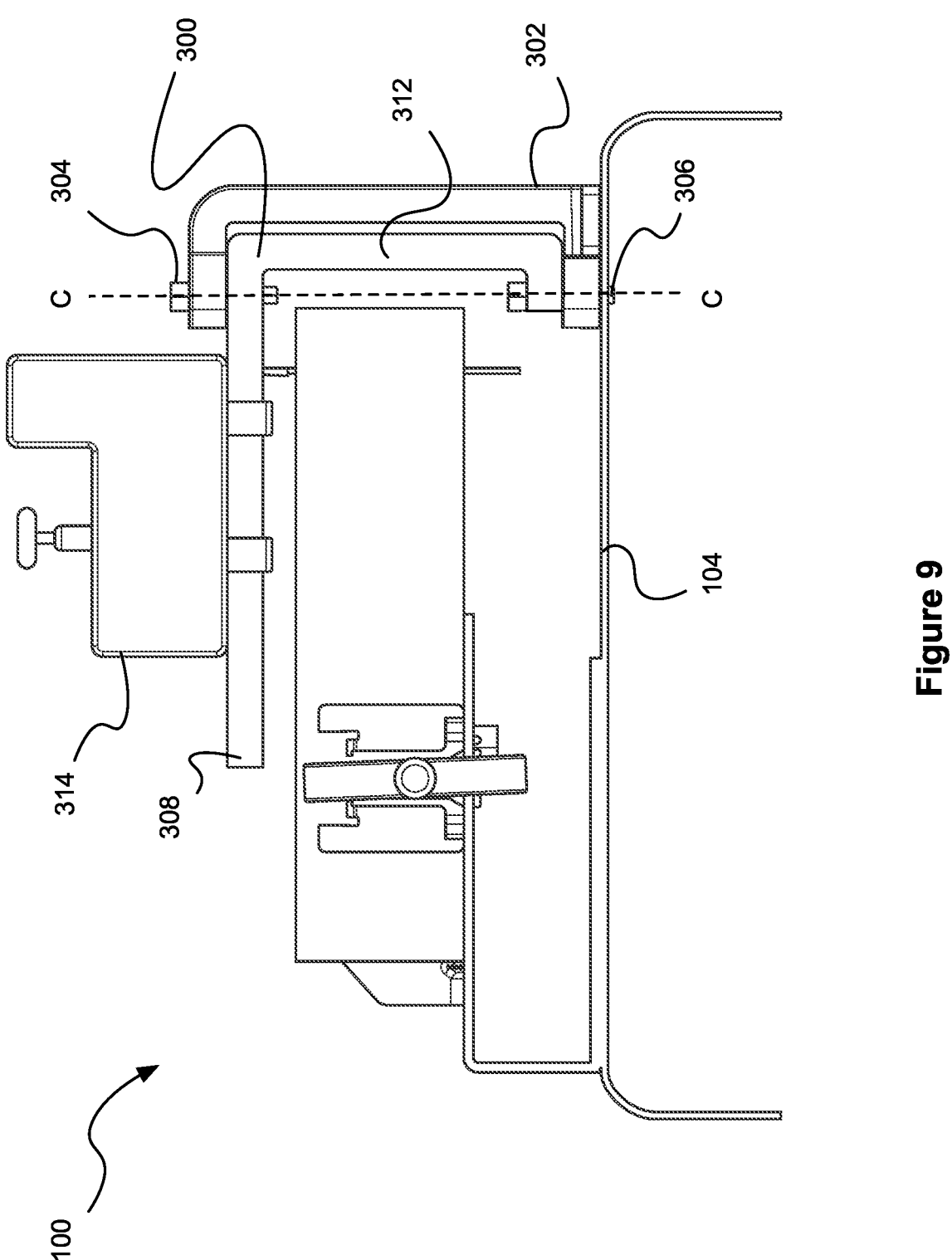
FIG. 9 shows a side view a profile cutting tool according to an example.

In some less preferred examples, alternatively, the pivotable frame 300 does not comprise a lower pivotable arm 310. An alternative arrangement is shown in FIG. 9 which is identical to FIG. 3 except that the pivotable frame 300 has been modified. Instead the pivotable frame 300 comprises only the upper pivotable arm 308. The arrangement as shown in FIG. 9 can be further modified by inserting a single pivot pin (not shown) through a bore (not shown) in the upright connecting portion 312. The arrangement as shown in FIG. 9 may be less preferrable because the profile cutting tool 100 may make less precise cuts in the workpiece 102.

The pivotable frame 300 will now be further described in reference to FIG. 5. The upper pivotable arm 308 and the lower pivotable arm 310 respectively comprise an upper blade slot 500 and a lower blade slot 502. The upper blade slot 500 and the in the upper pivotable arm 308 optionally creates a pair of upper pivotable arms 510a, 510b. The lower blade slot 502 and the in the lower pivotable arm 310 optionally creates a pair of lower pivotable arms 512a, 512b. The upper blade slot 500 and the lower blade slot 502 are configured to receive the cutting blade 316. In this way, the cutting blade 316 can pass through upper pivotable arm 308 and the lower pivotable arm 310 without engaging either of the upper pivotable arm 308 and the lower pivotable arm 310.

The workpiece cutting assembly 314 is mounted to the upper pivotable arm 308. The workpiece cutting assembly 314 comprises a housing 128 and motor 124 mounted within the housing 128. The motor 124 is configured to drive a reciprocating tool holder 126. The reciprocating tool holder 126 in some examples comprises a scotch yoke mechanism 130 (as shown in FIG. 1) configured to covert the rotational movement of the motor 124 into linear movement. A drive shaft (not shown) of the motor 124 is connected directly to the scotch yoke mechanism 130 to drive the linear movement of the reciprocating tool holder 126. Alternatively, the drive shaft of the motor 124 is connected to gearing or a gearbox which in turn drives the scotch yoke mechanism 130. Whilst FIG. 1 illustrates the rotational movement of the motor 124 converted into linear reciprocal movement via a scotch yoke mechanism 130, any suitable alternative mechanism can be used.

The reciprocating tool holder 126 is configured to hold a cutting blade 316. In this way, when the motor 124 is actuated, the cutting blade 316 reciprocates along a blade axis E-E (best shown in FIG. 3).

The motor 124 is coupled to a power source (not shown). In some examples the power source is a battery. The battery can be removably mounted to the housing 128 of the workpiece cutting assembly 314. Alternatively or additionally, the power source is a mains power source. In the example that the power source is a mains power source, a power cable (not shown) is routed through the upright bracket 302 so that that power cable does not interfere with the cutting blade 316 during operation. In some examples, the workpiece cutting assembly 314 comprises a user actuated button 320 configured to actuate the motor 124.

In some examples, the housing 128 of the workpiece cutting assembly 314 is configured to be gripped by the user during operation. In this way the housing 128 of the workpiece cutting assembly 314 has a dual purpose as a handle. The housing 128 may optionally comprise an ergonomic shape to fit a user's hand. Alternatively the pivotable frame 300 comprises a separate handle (not shown) for the user to grip and move the pivotable frame 300 during use.

In some examples, the workpiece cutting assembly 314 is slidably engageable with the pivotable frame 300. The housing 128 comprises a first and second guide brackets 504, 506 fixed to the underside of the housing 128. The first and second guide brackets 504, 506 comprise slots (not shown) for receiving each of the upper pivotable arms 510*a*, 510*b*.

The first and second guide brackets 504, 506 optionally comprise a locking mechanism (not shown) for selectively and securely locking the workpiece cutting assembly 314 to the upper pivotable arm 308. In some examples, the locking mechanism is a set screw mounted on either the first and second guide brackets 504, 506 and configured to engage the upper pivotable arm 308 when tightened. In some examples the set screw is configured to engage a reciprocal recess for receiving the tightened set screw. In some other examples, the first and second guide brackets 504, 506 comprise a friction fit with the upper pivotable arm 308. Accordingly, no locking mechanism is required and the friction fit will maintain the workpiece cutting assembly 314 in position on the upper pivotable arm 308. In this case, the user pushes the workpiece cutting assembly 314 with sufficient force to move the workpiece cutting assembly 314 along the upper pivotable arm 308.

In some examples the pivotable frame 300 comprises a radius scale 132 (best shown in FIG. 1) on the lower pivotable arm 310 indicating one or more predetermined cutting positions. The radius scale 132 in some examples indicates one or predetermined radii of the primary pipe 800. That is, the radius scale 132 indicates the radius of the profile to be cut in the workpiece 102.

In some examples, the lower pivotable arm 310 comprises a cutting blade guide bracket 318. Similar to the first and second guide brackets 504, 506, the cutting blade guide bracket 318 comprises slots for receiving each of the lower pivotable arms 512*a*, 512*b*. Similarly, the cutting blade guide bracket 318 is slidably engageable with the lower pivotable arm 310. FIG. 5 shows the cutting blade guide bracket 318 mounted on the lower pivotable arms 512*a*, 512*b*.

When the workpiece cutting assembly 314 is moved on the upper pivot arm 308, the cutting blade guide bracket 318 is also moved on the lower pivot arm 310. The cutting blade guide bracket 318 also comprises a cutting blade slot 508 configured to receive the cutting blade 316. The cutting blade slot 508 ensures that the cutting blade 316 remains aligned with a desired cutting blade axis E-E and does not bend. This helps make the profile cutting tool 100 more accurate during operation.

The cutting blade guide bracket 318 optionally comprise a locking mechanism (not shown) for selectively locking the cutting blade guide bracket 318 to the lower pivotable arm 310. In some examples, the locking mechanism is a set screw mounted on the cutting blade guide bracket 318 and configured to engage the lower pivotable arm 310 when tightened. In some examples, the set screw is configured to engage a reciprocal recess for receiving the tightened set screw. In some other examples, the cutting blade guide bracket 318 comprises a friction fit with the lower pivotable arm 310 and no set screw is needed.

Figure 6:
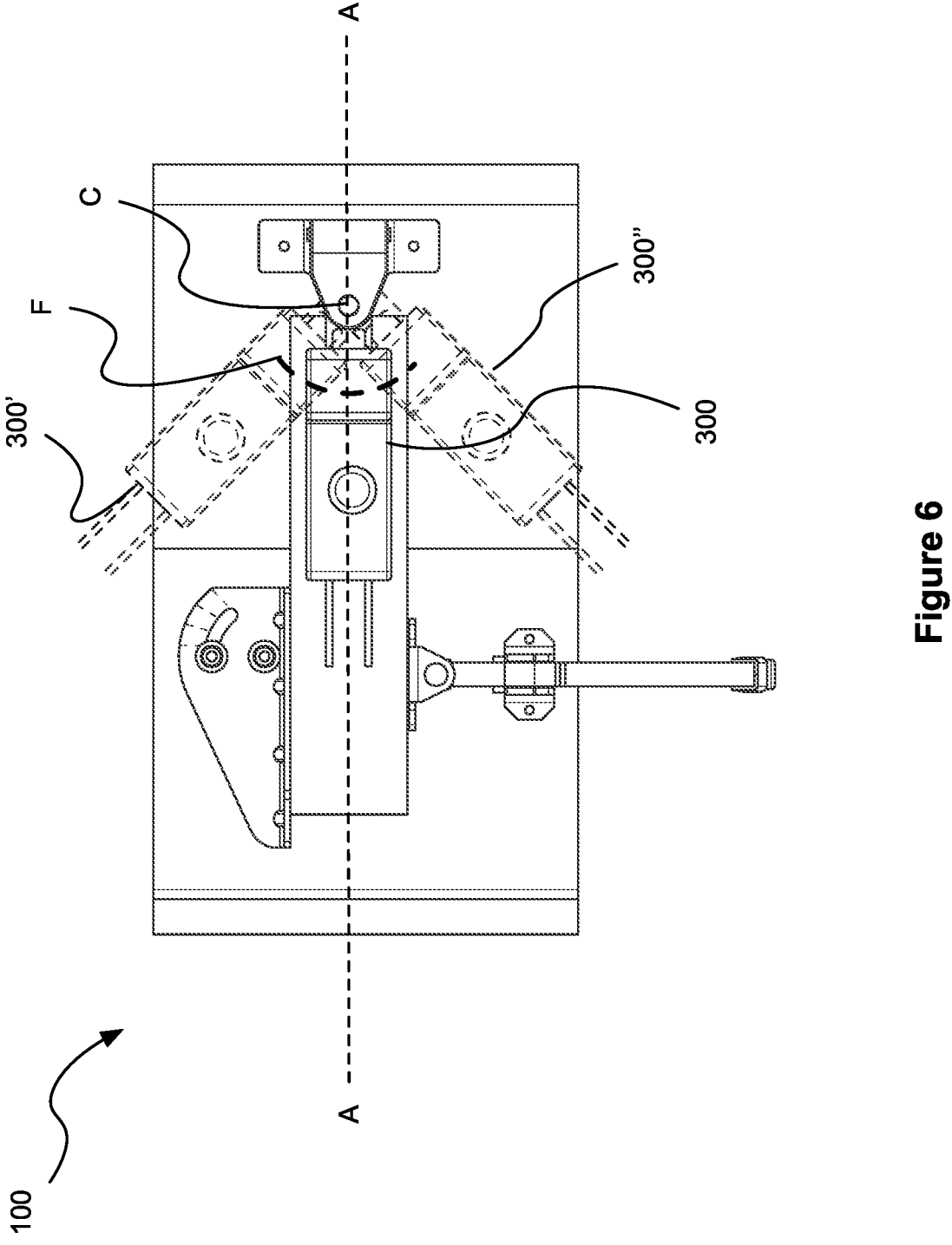
FIGS. 6 and 7 shows plan views of a profile cutting tool according to an example.
Figure 7:
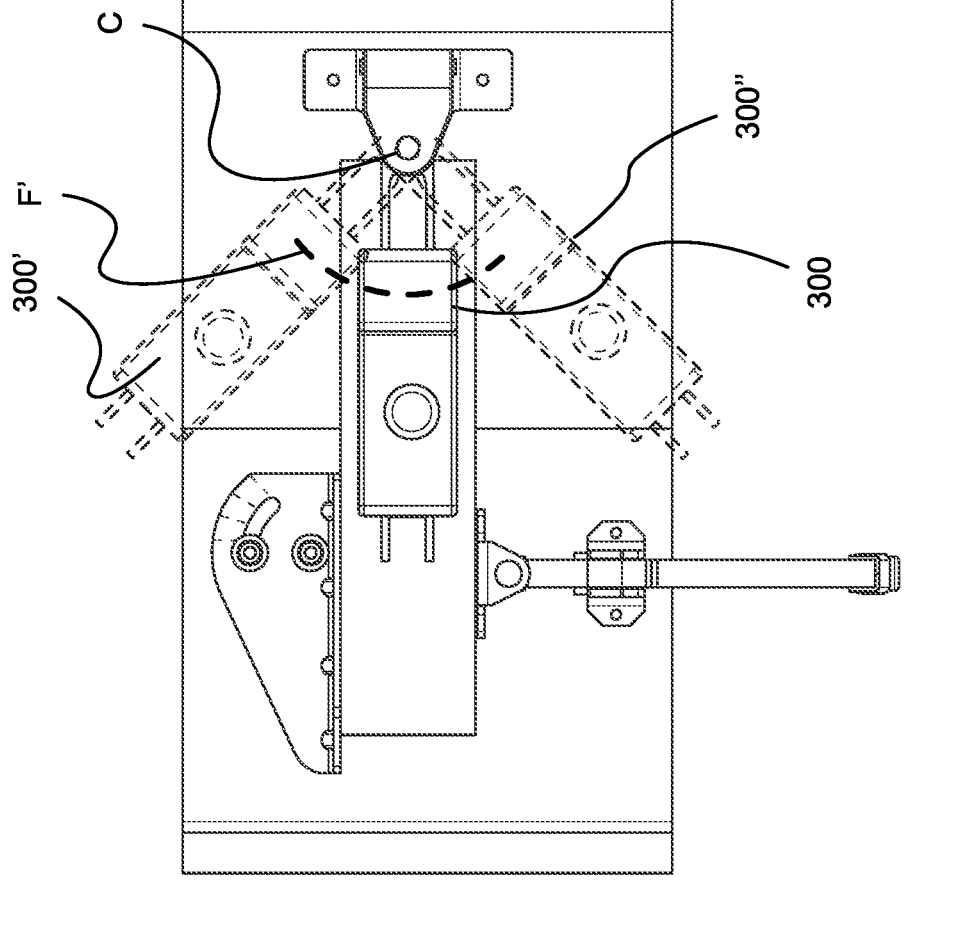
Figure 7:
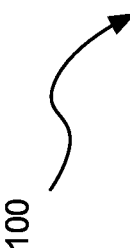

Operation of the profile cutting tool 100 will now be discussed in reference to FIGS. 6 and 7. FIGS. 6 and 7 shows plan views of the profile cutting tool 100 in different positions. FIG. 6 shows the pivotable frame 300 in a first position aligned with the longitudinal axis A-A of the workpiece 102. This corresponds to the position of the pivotable frame 300 as shown in FIGS. 1, 2, 3, 4, and 5. The first position of the pivotable frame 300 is represented in FIG. 6 with a solid line.

FIG. 6 also shows the pivotable frame 300 in a pivotable frame second position 300' and the pivotable frame 300 in a pivotable frame third position 300" having been pivoted about the pivot axis C. The pivotable frame second position 300' and the pivotable frame third position 300" are represented in FIG. 6 with dotted lines. The pivotable frame second position 300' and the pivotable frame third position 300" of the are when the cutting blade 316 is not engaging the workpiece 102. When the pivotable frame 300 moves about the pivot axis C, the cutting blade 316 is configured to move along a first arcuate cutting path F of a profile having a first radius r1. As mentioned above, the first radius r1 of the first arcuate cutting path F is the radius of a primary pipe 800.

The cutting process of the workpiece 102 using the profile cuter 100 will now be described. The workpiece 102 is secured using the workpiece clamp 114 as described above. The pivotable frame 300 is positioned so that it is at the pivotable frame second position 300' as shown in FIG. 7. The workpiece cutting assembly 314 is then actuated and the pivotable frame 300 is moved so that it is at the pivotable frame third position 300" as shown in FIG. 7. As mentioned above the user can manually push the pivotable frame 300 from the pivotable frame second position 300' to the pivotable frame third position 300".

FIG. 7 shows the pivotable frame 300 in a first position aligned with the longitudinal axis A-A of the workpiece 102. The workpiece cutting assembly 314 is in a different position to the position shown in FIG. 6. In FIG. 7 the workpiece cutting assembly 314 has been moved further away from the pivot axis C than as shown in FIG. 6.

The first position of the pivotable frame 300 is represented in FIG. 7 with a solid line. FIG. 7 also shows the pivotable frame 300 in a pivotable frame second position 300' and the pivotable frame 300 in a pivotable frame third position 300" having been pivoted about the pivot axis C. The pivotable frame second position 300' and the pivotable frame third position 300" are represented in FIG. 7 with dotted lines. When the pivotable frame 300 moves about the pivot axis C, the cutting blade 316 is configured to move along a second arcuate cutting path F' of a profile having a first radius r1. As mentioned above, the first radius r1 of second arcuate cutting path F' is the radius of a primary pipe 800.

Since the workpiece cutting assembly 314 is in a different position to the position shown in FIG. 6, the second arcuate cutting path F' as shown in FIG. 7 has a larger radius than the first arcuate cutting path F as shown in FIG. 6. Accordingly, the first arcuate cutting path F and the second arcuate cutting path F' match different sized primary pipes 800 having different a first radius r1 (best shown in FIG. 8).

This means that the user can easily adjust the profile radius that is being cut into the workpiece 102 e.g. the secondary pipe 102. This is advantageous because the user does not have to change the cutting blade 316 to adjust the radius of the profile to be cut.

In some examples, the workpiece cutting assembly 314 comprises a circular saw, a hole saw, a reciprocating saw, a band saw, a laser cutter, a plasma cutter, a grinding disk, a serrated rod, or a serrated cable. Indeed, the workpiece cutting assembly 314 can comprise any suitable cutter for cutting the profile curve in the workpiece 102.

In another example, two or more examples are combined. Features of one example can be combined with features of other examples.

Examples of the present disclosure have been discussed with particular reference to the examples illustrated. However it will be appreciated that variations and modifications may be made to the examples described within the scope of the disclosure.

What is claimed is:

1. A profile cutting tool comprising:
   a base;
   a clamp mounted to the base and configured to hold a workpiece such that the workpiece is elevated relative to the base;
   a frame pivotably mounted to the base; and
   a workpiece cutting assembly mounted to the frame and comprising a cutter configured to cut the workpiece,
   wherein pivoting the frame relative to the base causes the cutter to follow an arcuate cutting path through the workpiece.

2. The profile cutting tool according to claim 1, wherein the workpiece cutting assembly is repositionable along the frame relative to a pivot axis of the frame.

3. The profile cutting tool according to claim 2, wherein the workpiece cutting assembly further comprises a lock mechanism configured to secure the workpiece cutting assembly in a position along the frame.

4. The profile cutting tool according to claim 1, wherein the frame comprises an upright portion and an arm that extends outward from the upright portion.

5. The profile cutting tool according to claim 4, wherein the arm is a first arm and the frame further comprises a second arm that extends outward from the upright portion.

6. The profile cutting tool according to claim 5, wherein the first arm defines a first slot that extends into a distal end of the first arm and the second arm defines a second slot that extends into a distal end of the second arm, the first slot and the second slot configured to receive a cutting blade of the cutter therein.

7. The profile cutting tool according to claim 5, wherein the frame is configured such that, as the cutter cuts the workpiece, the first arm moves above the workpiece and the second arm moves below the workpiece.

8. The profile cutting tool according to claim 4, wherein the first arm defines a slot that extends into a distal end of the arm, the slot configured to receive a cutting blade of the cutter therein.

9. The profile cutting tool according to claim 1, wherein the cutter is a reciprocal cutting blade.

10. The profile cutting tool according to claim 1, wherein the workpiece cutting assembly further comprises a motor operatively coupled to the cutter.

11. The profile cutting tool according to claim 1, further comprising:

a platform that is mounted to the base and positioned above the base,
   wherein the clamp is mounted on the platform.

12. The profile cutting tool according to claim 11, wherein the frame includes an arm that extends outward relative to a pivot axis of the frame, the arm arranged to move between the platform and the base.

13. The profile cutting tool according to claim 1, wherein the clamp comprises a pivotable fence and a pivotable workpiece engagement plate configured to clamp the workpiece against the pivotable fence.

14. The profile cutting tool according to claim 1, wherein the workpiece cutting assembly further comprises at least one guide bracket that slidably couples the workpiece cutting assembly to the frame.

15. The profile cutting tool according to claim 14, wherein the frame comprises indicia corresponding to a plurality of predetermined positions for the at least one guide bracket, each of the plurality of predetermined positions corresponding to a different radius of the arcuate cutting path.

16. The profile cutting tool according to claim 15, wherein the indicia comprises a scale indicating the plurality of predetermined positions.

17. A profile cutting tool according to claim 1, wherein the base comprises an upright bracket and the frame is pivotably mounted to the upright bracket.

18. The profile cutting tool according to claim 17, wherein the upright bracket defines a pivot axis about which the frame pivots, the workpiece cutting assembly defines a blade axis along which the cutter cuts, and the blade axis and the pivot axis extend parallel to one another.

19. A profile cutting tool comprising:
   a base configured to hold a workpiece;
   an upright bracket attached to the base;
   a frame pivotably mounted to the upright bracket via an upper pivot pin and a lower pivot pin that are spaced apart from one another along a pivot axis of the frame;
   a cutting blade carried by the frame; and
   a motor configured to cause the cutting blade to move relative to the frame, wherein the frame and the cutting blade are configured to pivot relative to the base while the motor moves the cutting blade relative to the frame to make an arcuate cut in the workpiece.

20. The profile cutting tool of claim 19, wherein the base is configured to hold the workpiece such that the workpiece is elevated relative to the base.

* * * * *